United States Patent [19]

Clark, Jr.

[11] 4,157,014
[45] Jun. 5, 1979

[54] DIFFERENTIAL PRESSURE SYSTEM FOR GENERATING POWER

[76] Inventor: Robert W. Clark, Jr., 2232 W. Joan de Arc Ave., Phoenix, Ariz. 85029

[21] Appl. No.: 657,877

[22] Filed: Feb. 13, 1976

Related U.S. Application Data

[63] Continuation-in-part of Ser. No. 555,399, Mar. 5, 1975, abandoned.

[51] Int. Cl.² .................... F03G 7/06; F01K 23/02
[52] U.S. Cl. ........................... 60/655; 60/530; 60/682; 60/641
[58] Field of Search .............. 137/564; 60/530, 641, 60/650, 682, 655

[56] References Cited

U.S. PATENT DOCUMENTS

| | | | |
|---|---|---|---|
| 1,032,236 | 7/1912 | Patten | 60/650 |
| 1,108,550 | 8/1914 | Chubb | 137/564 X |
| 1,493,368 | 5/1924 | Merz | 60/641 |
| 2,255,460 | 9/1941 | Weaver | 137/564 |
| 2,979,888 | 4/1961 | Moloney | 60/530 |
| 3,055,170 | 9/1962 | Westcott, Jr. | 60/530 |
| 3,375,664 | 4/1968 | Wells, Jr. | 60/682 X |
| 3,752,395 | 8/1973 | Ashikian | 60/641 |
| 3,875,749 | 4/1975 | Baciu | 60/641 |

FOREIGN PATENT DOCUMENTS 475226  2/1915  France ........................ 60/641

Primary Examiner—Allen M. Ostrager
Attorney, Agent, or Firm—Cahill, Sutton & Thomas

[57] ABSTRACT

Temperature induced density differences between two connected columns of a fluid establish a pressure differential which is converted into kinetic energy for driving a power generating unit responsive to fluid flow.

7 Claims, 4 Drawing Figures

DIFFERENTIAL PRESSURE SYSTEM FOR GENERATING POWER

The present application is a continuation-in-part of an application filed on Mar. 5, 1975, assigned Ser. No. 555,399, now abandoned, entitled "Differential Pressure System" and describing an invention by the present inventor.

The present invention relates to power generating systems and, more particularly, to power generating systems which receive energy from phenomena occurring in nature.

The production of useable and consumable energy, such as electrical energy, requires an input of fuel to power the electrical energy producing apparatus except, of course, hydro electric power generating stations which are georgraphically limited. To date such fuels have been predominantly coal, natural gas or variously refined crude oils. The limited production of useable energy through atomic fission has made only limited inroads into the ever increasing need for coal, gas and oil. This existing dependency by all nations upon coal, gas and oil and the expected increasing dependency by at least a few nations upon fissionable materials, places the nations having substantial quantities of these raw materials in a very superior economic position with respect to the remaining nations of this world. Such economic dependence necessarily has significant political and military implications and may result in alliances which are not in the best nationalistic interests of the economically dependent nations.

It is therefore a primary object of the present invention to provide an energy generating system which is not dependent upon the consumption of any raw materials.

Another object of the present invention is to provide a power generating system which receives an input of energy from phenomena occurring in nature.

Yet another object of the present invention is to provide a power generating system which is employable anywhere in the world.

Still another object of the present invention is to provide a power generating system which operates most efficiently at locations wherein the need for heating and/or cooling are the greatest.

A further object of the present invention is to provide a power generating system for converting the temperature difference between two locations into kinetic energy.

A still further object of the present invention is to establish pressure differentials induced by differences in temperature into a harnessable flow of fluid.

A yet further object of the present invention is to establish segregated but co-acting systems employing different fluids, each of which systems generate kinetic energy and through their co-action develop a segregable ice slush.

These and other objects of the present invention will become apparent to those skilled in the art as the description thereof proceeds.

The present invention may be described with greater specificity and clarity with reference to the following figures, in which.

Water and other liquids, such as fluoro carbon liquid, FC 88, decrease in density with the increasing temperature while in the liquid state. With an understanding of these facts, a discussion of the differential pressure system will be undertaken with reference to FIG. 1.

Figure 1:
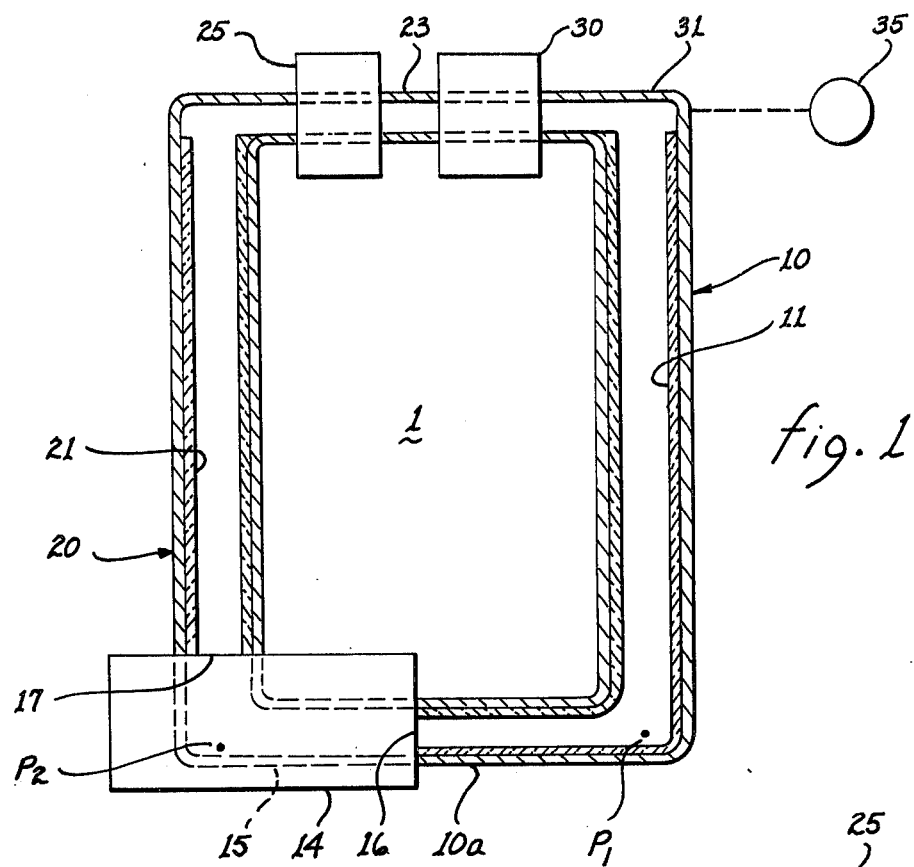
FIG. 1 illustrates the operative structural elements of the present invention.

The fundamental elements of the differential pressure system 1 are illustrated in FIG. 1. A generally vertically oriented pipe 10 includes an elbow segment 10a. Pipe 10 and segment 10a are well insulated by insulation 11, which may be interior or exterior of the pipe and segment. The insulation serves to minimize heat losses or heat gains by inhibiting transfer of heat through the wall of the pipe and segment. A heat transfer unit 15 is disposed in proximity to a heat source 14. The unit includes an inlet 16 for receiving fluid from segment 10a and an outlet 17 through which the received fluid is discharged.

A second generally vertically oriented pipe 20 is attached to outlet 17 and is in fluid communication with unit 15. Insulation 21 is disposed interior or exterior to pipe 20 to minimize heat transfer between the fluid flowing within pipe 20 and the surrounding medium. In some configurations of the power generating system the heat transfer unit 15 and insulation 21 may be omitted. In this configuration, vertically oriented pipe 20 will serve the function of the heat transfer unit. This variant is useful when the heat source is a large body of water in which the pipes are immersed.

A power transfer system 25, such as a turbine responsive to a flow of fluid and driving an electric generator, is in fluid communication with the upper end of pipe 20. The fluid outflowing from power transfer system 25 flows through pipe 26 into a heat sink 30, which heat sink draws off heat from the fluid flowing therethrough and reduces the temperature of the fluid. The fluid flow output from heat sink 30 feeds into the upper end of pipe 10 through pipe 31. To initiate circulatory fluid flow within the above described conduits, an ancillary pump 35 may be employed.

In operation, pressure differential system 1 is filled with a fluid which decreases in density with increasing temperature, such as water, ammonia water, or FC 88. Heat source 14 will tend to raise the temperature of the fluid contained within unit 15 and reduce the density of the fluid. The reduced density fluid will tend to rise from unit 15 to displace the cooler and more dense fluid within pipe 20. Because the fluid initially contained within pipe 20 will, in all probability, not be flowing either upwardly or downwardly, the initially heated fluid within unit 15 may rise into pipe 20 to displace the higher density fluid therein, the latter flowing downwardly into the unit, with the result being a circulatory flow within and between pipe 20 and unit 15.

To prevent such initial and essentially useless circulatory flow, pump 35 may be energized. Upon energization of pump 35, fluid will be forced to flow downwardly into pipe 10, through segment 10a and unit 15, upwardly through pipe 20, through power transfer system 25, through heat sink 30 and back into pipe 10. Thus, a basic circulatory fluid flow is established. After such circulatory flow has been established, the fluid, heated within unit 15 in response to transfer of heat from heat source 14, will be reduced in density and will accelerate the flow of fluid upwardly through pipe 20. Insulation 21 will tend to maintain the fluid flowing through pipe 20 at an essentially uniform temperature and density. The fluid flow emanating from pipe 20 will have a certain degree of kinetic energy to operate power transfer system 25. The power transfer system converts the kinetic energy of the fluid into a different form of energy, such as electricity. The temperature of the fluid exhausted from power transfer system 25 through pipe 26 into heat sink 30 will be reduced by the transfer of heat to the heat sink. From the heat sink, the cooled fluid flows through conduit 31 into the top of pipe 10. The resulting increase in temperature of the heat sink may also be harnessed to perform useful work or be of other benefit.

Upon reduction of the temperature of the fluid within the heat sink, the density of the fluid will be increased. Thus, the fluid flowing into the top of pipe 10 is of a greater density than the fluid flowing out of pipe 20.

Insulation 11 within or associated with pipe 10 and segment 10a will tend to prevent heat transfer into or out of the fluid flowing downwardly within the pipe and through the segment. Thereby, the density is maintained relatively constant. The fluid, on flowing from segment 10a into unit 15 and therein subjected to heat source 14, will be raised in temperature and undergo a reduction in density. Heat source 14 will continuously raise the temperature and lower the density of the fluid flowing through unit 15 and thereby continuously maintain the fluid within pipe 20 at a lower density than the fluid within pipe 10. The reduced density fluid will again flow upwardly through pipe 20 and a repetitive cycle will have been established. At this point, the pumping action of pump 35 is no longer necessary and it may be disconnected from system 1.

If the two pipes were not connected at the bottom, the pressure existing at point P1 at the bottom of pipe 10 is a function of the density of the fluid within the pipe times the height of the column of the fluid. Similarly, the pressure existing at the point P2 at the bottom of pipe 20 is a function of the density of the fluid therein times the height of the column. When the two columns are connected, the differential pressure that would exist is exerted. Assuming both columns to be essentially of equal height, any variation in pressure at points P1 and P2 is a function of the respective densities of the associated columns of fluid. As the two pipes are in fact connected and as for reasons stated above, the fluid within column 10 is more dense than the fluid within column 20, the pressure differential will induce a fluid flow downwardly through pipe 10 and upwardly through pipe 20.

Once flow has been initiated, the pressure differentials at point P1 and P2, established by the force of gravity alone, will perpetuate the flow so long as the fluid acquires heat at the bottom of system 1 and dissipates heat at the top of the system. The kinetic energy of this flow, which is a function of the pressure differential at points P1 and P2 times the volume of flow, is available for generating electric power or other useable energy.

The magnitude of this kinetic force is dependent upon the following factors:

1. the actual vertical height of pipes 10 and 20. If the pipes are inclined, only the vertical height and not pipe length is relevant.
2. the usefulness of the fluid, as determined by the weight change per unit volume per unit of heat—specifically, all non-viscous fluids can be ranked and compared by the following formula: index of usefulness equals the coefficient of expansion per degree of temperature change times the density of the fluid divided by the specific heat of the fluid;
3. the magnitude of the temperature differential (the actual temperatures are of little or no consequence—it should be noted that the magnitude of the kinetic force is related only indirectly to heat in spite of the fact that the density change is heat induced. A linear relationship between kinetic force and heat exists only if depth is held constant, if the fluid is specified, and if the fluid has a linear coefficient of expansion); and
4. the volume of flow.

Figure 2:
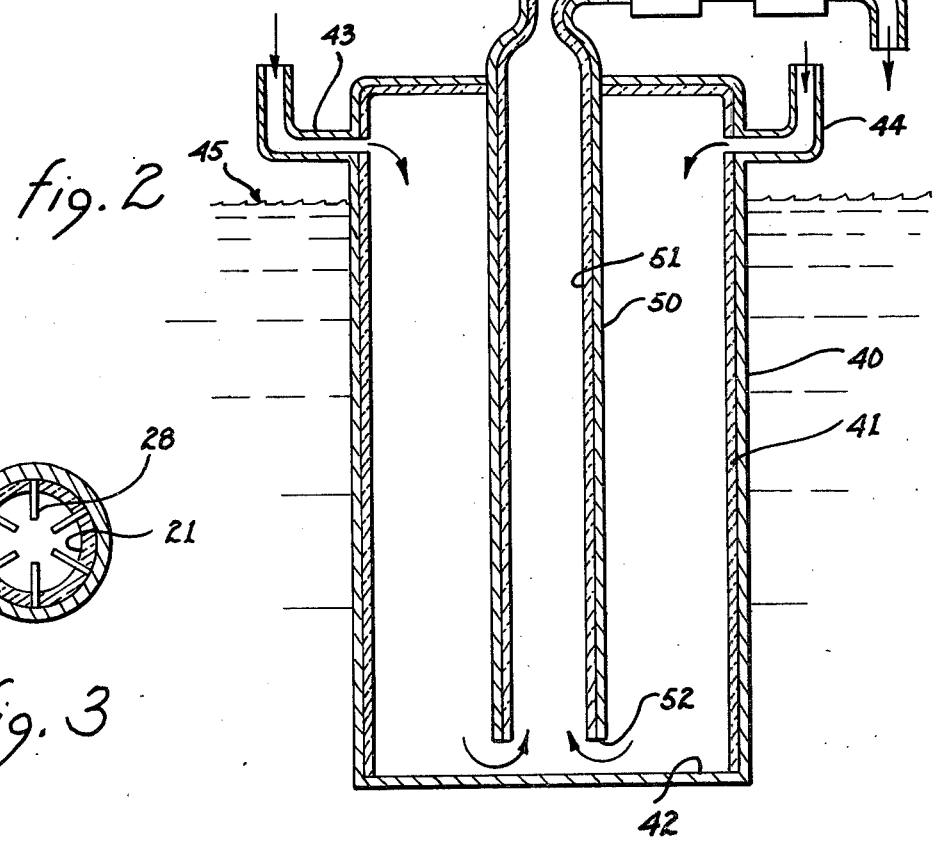
FIG. 2 illustrates a variant of the present invention.

Referring to FIG. 2, there is shown a variant of the present invention which is particularly adapted to utilization of a geothermal heat source, even one of low grade (the average geothermal gradient is 1° F. per 100 ft. of depth). A large body of water bordering the land would serve as the supply source for cold water. Water from this body of water, preferably as cold as possible, is fed through input pipes 43, 44 into the top of pipe 40, insulated with insulation 41, and extending vertically into earth 45. Lower end 42 of this pipe is heated by the geothermal heat source. The uninsulated lower end 42 serves as a heat transfer unit for receiving heat from the geothermal heat source. A hot water pipe 50, insulated with insulation 51, is disposed within pipe 40 and may be located concentric therewith. Lower end 52 of pipe 50 serves as an outlet for the heat transfer unit formed by lower end 42. Pipe 50 is connected to and feeds water upwardly into power transfer system 25 wherein the kinetic energy of the flowing water is converted to a useable form of energy, such as electricity. The water discharging from the power transfer unit is conveyed through pipe 26 to heat sink 30, which may be a heat engine utilizing the heat content of the water. Therefrom, the water may be discharged into the source of cold water through conduit 24.

The system described above may be termed an open loop system as opposed to the system described previously, which may be termed a closed loop system.

In operation, the cold water enters pipe 40 through inlet pipes 43 and 44 and flows downwardly. The temperature of the downwardly flowing water is maintained relatively constant as insulation 41 essentially precludes heat transfer between it and the surrounding sea 45. Lower end 42 of pipe 40 is specifically configured to encourage heat transfer from the adjacent geothermal source into the pipe, resulting in a temperature increase of the water within the lower end of the pipe. The increase in temperature results in an expansion and lowering of the density of the water. The lower density water is forced to flow upwardly into pipe 50 by the higher density water within pipe 40. Insulation 51 essentially precludes lowering of the temperature of the water flowing upwardly therein and the lower density is essentially maintained throughout the passage within pipe 50. Thus, although the structure illustrated within FIG. 2 differs from that illustrated in FIG. 1, the principle of operation is maintained and the benefits achieved are preserved.

The structure shown in FIG. 2 is also employable at locations where an unlimited supply of fluid is not available. For such locations, such as an existing mine shaft or an earth encased bore, the fluid (which may be water or other liquid) discharged from conduit 31 feeds directly back into pipe 40 through either or both input pipes 43, 44. Hence, embodiment of the present invention illustrated in FIG. 2 is employable within a single drilled hole extending downwardly into the ground and operating in a closed loop mode.

There is no real means of compensating for heat loss from the hot pipe because all heat loss is a loss. Friction can be useful in increasing the temperature of the fluid within the hot pipe when the change in density (caused by an increase in temperature) times depth causes a greater increase in differential pressure than the loss of pressure caused by the conversion of mechanical energy into heat energy. Only on satisfaction of this requirement would friction be deliberately induced. The usefulness of friction is therefore dependent upon the vertical distance involved and the expansion characteristics of the liquid involved.

Figure 3:
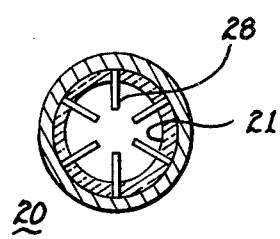
FIG. 3 illustrates a modification of one of the pipes of the present invention.

FIG. 3 illustrates a means for developing heat producing friction within the hot pipe (illustrated in either FIGS. 1 or 2) as no insulation is perfect. By inserting a plurality of plates 28 longitudinally oriented within the pipe, the surface area in contact with the flowing fluid is increased. Hence, additional friction is created by the fluid flowing through the pipe, which friction tends to generate heat. Thereby, the elevated temperature of the flowing fluid can be maintained or even increased. It is to be understood that plates 28 are only representative of a structure for increasing the friction attendant the flowing fluid.

When the hot pipe is surrounded by the feed pipe, as illustrated in FIG. 2, the insulation of the hot pipe may be omitted. The resulting heat loss from the hot pipe is a heat gain for the fluid in the cold or feed pipe. This embodiment is useful under specific conditions, particularly where only a limited heat source is available.

Turning now to the applicability and practicality of the present invention, it will become apparent that the system is adaptable to widely varied climatic, geographic and geological conditions. To illustrate this wide range of useful application, the southwestern region of the United States will be considered as representative. Underlying many areas of this region, there exist heated saline water deposits. Such deposits are also found in rift valley areas in other parts of the world. While some of these deposits near the southern tip of the Salton Sea have temperatures as high as 750° F., far more numerous deposits have temperatures in the 160° F. to 240° F. range; this range offers little or no power generating potential using current technology. For illustrative purposes, it will be assumed that a heated saline water deposit, serving as heat source 14 (see FIG. 1), has a temperature of only 170° F. at a depth of 3,000 feet. It will also be assumed that the summertime noon temperature at the surface (serving as heat sink 30) is 120° F. Thus, under the worst case conditions, the temperature differential is only 40° F. and the resulting density variation per cubic foot of volume of a representative fluid having the expansion characteristics of FC 88, produces a weight variation of 3.8 pounds per cubic foot. Under these somewhat restrictive conditions, the power generating potential of the present system using FC 88 provides a differential pressure of 3.8 pounds per foot of depth which, for a depth of 3,000 feet, is 11,400 foot pounds per cubic foot of flow. A flow rate of 100 cubic feet per second would provide 1,140,000 foot pounds per second of kinetic energy. If power transfer system 25 has an efficiency of 90%, this kinetic energy would produce 1,391 kilowatts of electric power per hour.

In conclusion, the present invention, operating within a temperature range of small magnitude and employing the rather incongruous desert summer air as a heat sink, is capable of generating a significant amount of power.

Considering another example, the temperature differential that exists between ambient air on the desert floor and ambient air at the top of a 5,000 to 7,000 foot mountain adjacent the desert is nominally in the range of 30° F. to 70° F. Assuming a differential of only 30° F. and a height of 5,000 feet and employing a fluid with the expansion characteristics of FC 88, the pressure differential is 2.85 pounds per foot of height. The resulting power generating potential is 14,250 foot pounds per cubic foot of flow. Thus, a flow rate of 100 cubic feet per second and a power transfer system efficiency of 90% would produce 1,739 kilowatts per hour. Should solar energy be used to raise the temperature of the heat source on the desert floor, the power generating potential would be increased proportionally, assuming a linear coefficient of expansion of the fluid.

Another geographical area wherein the present invention may be readily employed is that of the polar seas. Assuming the temperature of the sea water at some depth within the polar seas to be 45° F., with an ambient air temperature at the water surface of 15° F., there exists a 30° F. temperature difference. The resulting power generation capability would be in accordance with the above example for a 30° F. temperature change. When the ambient air temperature decreases to −35° F., not at all unusual, an 80° temperature difference exists with a correspondingly increased power generation capability. Other areas capable of providing naturally occurring temperature differentials include the Gulf of Bothnia, the Baltic Sea, the Norwegian Sea, the Barents Sea, the Greenland Sea, Baffin Bay, the North Atlantic and the North Pacific Ocean along the shores of Finland, Sweden, Norway, Greenland, Canada, Alaska, and Russia. As alluded to earlier, the greatest temperature differentials exist in the areas where the need for heat and light is also the greatest. During the summertime, when the ambient surface temperature may be greater than the temperature at some depth within an adjacent sea, glaciers, glacial melt water or permafrost cooled water would have to be used as the heat sink.

Considering the potential of using existing abandoned or inactive mines as the location of the present invention, the following example is demonstrative of the potential of the present invention. A copper mine in Superior, Arizona, has a recorded temperature of 150° F. at a depth of 4,600 feet, an average yearly surface temperature of 72.4° F., and resulting in an average temperature difference of approximately 80°. During the wintertime, the surface temperature is necessarily substantially less while the temperature at depth is relatively constant and results in an increased temperature difference. This temperature difference in combination with the available height, is capable of providing an enormous amount of kinetic energy for translation into electric power. Similar conditions exist in other mines throughout the world.

For mines which are still being worked, extensive air conditioning equipment must be employed to dissipate the naturally occurring high temperatures at substantial depth. The system described herein would alleviate, if not remove, such a need for air conditioning as it continuously would draw heat from the bottom of the mine. Thereby, excessive heat in the lower regions of mines could be alleviated with the added benefit of a power generating capability.

In summary, the invention described above is employable wherever naturally occurring heat sources and heat sinks exist and wherein such heat sources and heat sinks are separated in height and the degree of power output capability is primarily a function of the combination of temperature differential and height.

Figure 4:
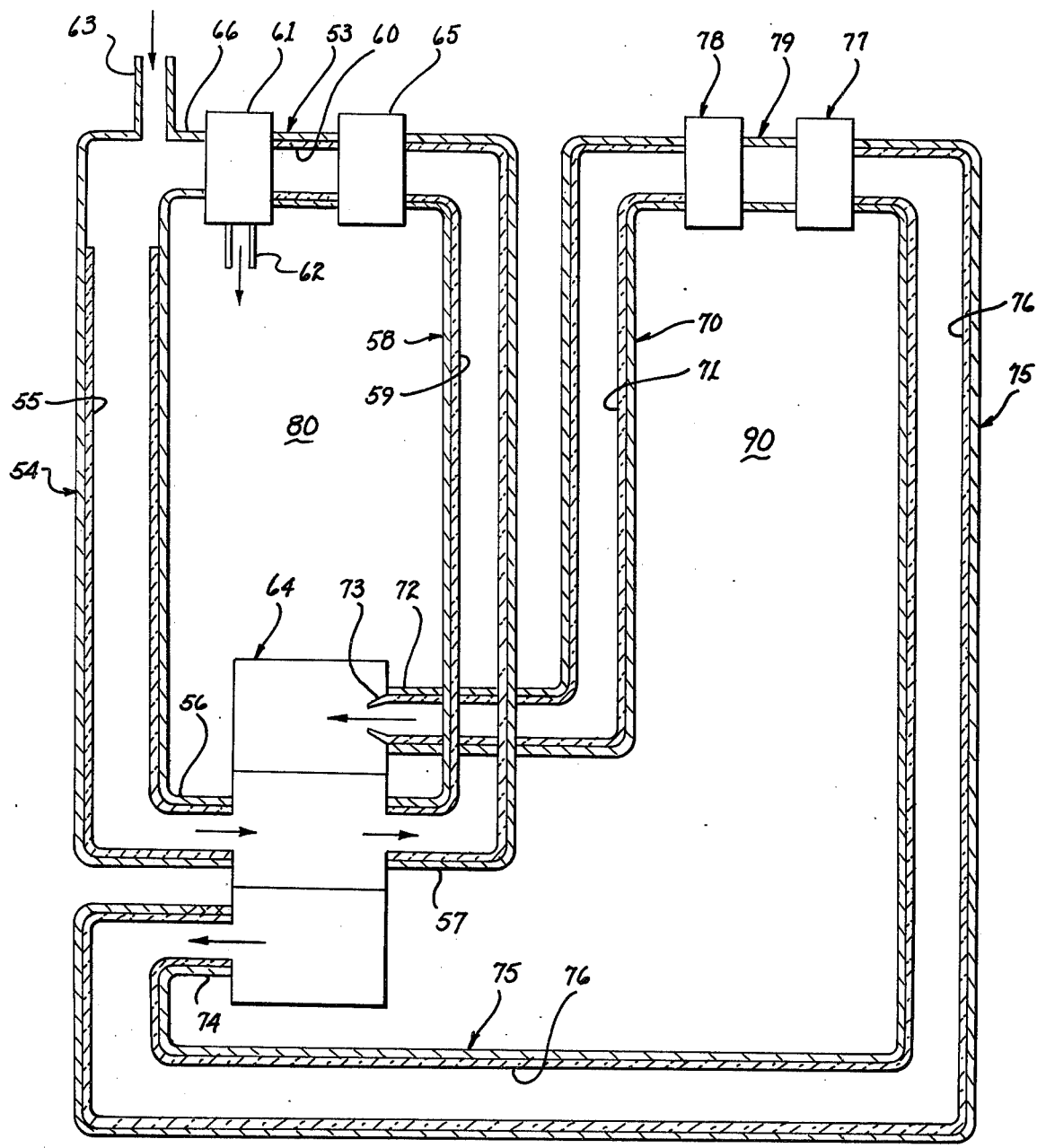
FIG. 4 illustrates two segregated but co-acting systems, each operating in accordance with the principles of the present invention.

Referring to FIG. 4, two segregated but co-acting systems are shown which operate in accordance with the principles discussed above with respect to the apparatus illustrated in FIG. 1. These two systems, identified by numerals 80 and 90 are each capable of generating power and by their co-action are capable of producing ice slush.

Before proceeding with a discussion of this system, it may be well to note that water and two metals, bismuth and gallium, share the anomaly of expanding below as well as above a given temperature; for pure water at atmospheric pressure, the temperature at which the water is the most dense is 3.98° Centigrade. That is, the density of water, bismuth and gallium decreases upon a temperature variation above or below a predetermined temperature.

The fluid contained within system 80 is water or one of the other known substances the density of which decreases as the temperature thereof is reduced below a certain temperature threshold. For illustrative purposes, it will be assumed that water is employed within system 80. The water flows downwardly through pipe 54, which pipe is thermally insulated by insulation 55. At some depth the water flows through outlet 56 of pipe 54 into a heat exchanger 64. Therein, the temperature of the water is reduced to approximately the freezing point of the water, nominally 0° C., depending upon the degree of salinity and pressure of the water, and an ice slush is formed. The ice slush and water composition flows through outlet 57 into pipe 58, which pipe is thermally insulated by insulation 59. As described above, the density of water reduces with a reduction in temperature from its maximum density at 3.98° C. Hence, the ice slush and water composition within pipe 58 will be less dense than the water within pipe 54. It is preferable that the temperature of the water within pipe 54 is as close as possible to 3.98° C. as this results in the greatest density difference and hence, pressure differential.

Because of the resulting pressure differentials within inlet pipe 56 and outlet pipe 57, as discussed above, the pressure exerted by the water within pipe 54 will force the ice slush and water composition within pipe 58 to flow upwardly to turbine 65. Turbine 65 converts the kinetic energy of the ice slush and water composition into a harnessable form of energy, such as electrical power. From the turbine, the ice slush and water composition is conveyed through pipe 53 to an ice separator 61. The ice slush is segregated from the ice slush and water composition and discharged through pipe 62. The water is discharged through outlet pipe 66 into pipe 54. In order to maintain water within system 80, makeup water is introduced through pipe 63.

The ice slush discharged through pipe 62 may be employed for cooling purposes or it may be operated upon to obtain desalinated water. Or, the ice slush may be used to reduce the temperature of the incoming water so that the resulting mixture would have a temperature of 3.98° C. or close thereto.

The fluid contained within system 90 must be a fluid with a critical boiling point (such as liquid ammonia, freon, or alcohol) at or below the freezing temperature of water, normally 0° C., depending upon purity. The liquid flows downwardly through pipe 70, which pipe is insulated with insulation 71, to inlet 72 of heat exchanger 64. The fluid is discharged from inlet 72 through an expansion nozzle or orifice 73 which converts the fluid from a liquid state to a gaseous state. The resulting expansion will absorb heat from any surrounding sources of heat, which, within heat exchanger 64, is the water flowing from inlet 56 to outlet 57. The fluid discharged flows from the heat exchanger through outlet 74 into pipe 75, which pipe is insulated with insulation 76.

As the density of the fluid within pipe 75 is necessarily in a gaseous form, its density will be substantially less than the density of the fluid within pipe 70. Again, for reasons stated above, the pressure existing within inlet 72 is substantially greater than the pressure within outlet 74 and the fluid within pipe 75 will be forced to flow upwardly into turbine 77.

Turbine 77 converts the kinetic energy of the received fluid into harnessable power, such as electrical energy. Therefrom, the fluid flows through pipe 79 into heat sink 78 wherein it is converted back to liquid form. The heat dissipated by the heat sink may be employed to perform useful work by any of many well known means.

In summary, the structure illustrated in FIG. 4 and described above employs two similarly operating but segregable though co-acting systems having different operating fluids which, in toto, each provides a power generating capability and one of the systems provides ice slush as a byproduct. The ice slush may be employed for ultimate use as a cooling medium or the ice slush may be desalinated by presently known means. Also, it may be well to point out that the operative element which maintains continuous circulatory flow through each of the systems is gravity and that because of the resultant differential pressures established by the difference in height between the heat exchanger and the respective kinetic energy conversion units, or turbines, no continuous pumping is needed; however, an initial pumping may be necessary to establish the circulatory flow. Furthermore, a separate heat source is not mandatory. Thereby, the total system illustrated in FIG. 4 does not need a constant input of consumable energy, assuming that the force of gravity is undiminishable, once circulatory flow within each of systems 80 and 90 has been established.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

What is claimed is:

1. A system having two segregated but co-acting subsystems for generating power by employing induced density variations of the fluid within each of the subsystems, which density variations result in a pressure differential in each fluid to generate a harnessable flow of the respective fluid, said system comprising in combination:

I. a first subsystem comprising:

a. a first fluid having the characteristic of density reduction in response to a temperature variation above or below a first predetermined temperature and having the further characteristic of conversion to a mixture of said first fluid in a solid and liquid state at a second predetermined temperature;
b. first pipe means extending downwardly for conveying downwardly a flow of said first fluid at a first range of temperature and density;
c. heat exchange means disposed in proximity to the lower end of said first pipe for reducing the temperature and the density of said first fluid from the first range of temperature and density to a temperature equal to or less than the second temperature and within a second range of temperature and density, said heat exchange means having an inlet for receiving the flow of said first fluid from said first pipe means and an outlet for discharging the received flow of said first fluid;
d. second pipe means extending upwardly from said outlet for conveying upwardly said first fluid discharged through said outlet; and
e. power transfer means for receiving the flow of fluid from said second pipe means and converting the kinetic energy of the conveyed fluid into harnessable power; whereby, the density of said first fluid within said first pipe means is greater than the density of said first fluid within said second pipe means and the resulting pressure differential insures a continuing flow of said first fluid from said first pipe means into said second pipe means; and II. a second subsystem comprising:
a. a second fluid having a boiling point temperature at or below the second predetermined temperature of said first fluid;
b. third pipe means extending downwardly for conveying downwardly a flow of said second fluid at a third range of temperature and density;
c. said heat exchange means including:
i. a further inlet for receiving the flow of said second fluid from said third pipe means;
ii. an orifice for converting said second fluid from a liquid state to a gaseous state and reducing the temperature and the density of said second fluid conveyed through said further inlet from the third range of temperature and density to a fourth range of temperature and density wherein the temperature is equal to or less than the second predetermined temperature of said first fluid; and
iii. heat transfer means for transferring heat from said first fluid to said second fluid to reduce the temperature and density of said first fluid to the second range of temperature and pressure and convert said first fluid into a mixture of said first fluid in a solid and liquid state; and
iv. a further outlet for discharging the flow of said second fluid from said heat exchange means;
d. fourth pipe means extending upwardly from said further outlet for conveying upwardly said second fluid discharged through said further outlet; and
e. further power transfer means for receiving the flow of fluid from said fourth pipe means and converting the kinetic energy of the conveyed fluid into harnessable power; whereby, the density of said second fluid within said third pipe means is greater than the density of said second fluid within said fourth pipe means and the resulting pressure differential insures a continuing flow of said second fluid from said third pipe means into said second pipe means;

whereby, each of said first and second subsystems is capable of generating power and said first subsystem is capable of converting said first fluid in liquid form to a mixture of said first fluid in liquid and solid state without an external source of heat.

2. The system as set forth in claim 1 wherein said second fluid is defined as a fluid having a boiling point temperature no greater than the freezing point temperature of said first fluid.

3. The system as set forth in claim 1 wherein said first fluid is water with the first predetermined temperature being approximately 3.98° C. and the second predetermined temperature being approximately 0° C.

4. The system as set forth in claim 2 wherein the heat exchange means converts the water to an ice slush and water mixture for delivery to said second pipe means.

5. The system as set forth in claim 3 wherein the temperature of the boiling point of said second fluid is less than the freezing point of water.

6. The system as set forth in claim 8 including means for withdrawing the ice slush from said first fluid.

7. The system as set forth in claim 6 including input means for adding makeup water to said first subsystem.

* * * * *